United States Patent [19]

Bennett

[11] 4,278,629

[45] Jul. 14, 1981

[54] PREPARATION OF PADDED ARTICLES

[75] Inventor: Peter S. Bennett, Morecambe, England

[73] Assignee: Storey Brothers and Company Limited, England

[21] Appl. No.: 49,710

[22] Filed: Jun. 18, 1979

Related U.S. Application Data

[63] Continuation-in-part of Ser. No. 846,229, Oct. 27, 1977, abandoned, which is a continuation-in-part of Ser. No. 687,779, May 19, 1976, abandoned.

[30] Foreign Application Priority Data

May 27, 1975 [GB] United Kingdom ............... 23086/75

[51] Int. Cl.$^3$ ............................................ B29D 27/04
[52] U.S. Cl. .................................. 264/46.8; 264/46.6; 264/135; 264/267; 428/521; 428/423.9; 428/424.2
[58] Field of Search ..................... 264/46.8, 46.6, 46.7, 264/46.5, 135, 267; 428/425, 521; 156/90

[56] References Cited

U.S. PATENT DOCUMENTS

| | | | |
|---|---|---|---|
| 3,075,863 | 1/1963 | Frey | 156/90 |
| 3,382,138 | 5/1968 | Barth | 428/425 |
| 3,502,542 | 3/1970 | Wenisca | 428/425 |
| 3,528,848 | 9/1970 | Zoebelein | 428/521 X |
| 3,729,370 | 4/1973 | Cobbledick | 264/46.8 X |
| 3,911,190 | 10/1975 | Myers et al. | 264/46.5 X |

*Primary Examiner*—Philip Anderson
*Attorney, Agent, or Firm*—William A. Drucker

[57] ABSTRACT

A method of preparing a cushion or like padded article comprising a plasticized vinyl chloride polymer cover filled with foam in which the cover is shaped and the foam prepared in situ within the cover, wherein a superior bond between the cover and foam is achieved by coating the interior surface of the cover prior to foaming with a primer composition comprising:

(A) a latex of butadiene-acrylonitrile copolymer containing a hydroxyl or carboxyl group; and (B) a latex chosen from the group consisting of natural rubber, styrene-butadiene latex and mixtures thereof in an amount sufficient to promote bonding and wherein the weight ratio of (A) and (B) is from 4:1 to 1:4.

4 Claims, 4 Drawing Figures

4,278,629 ized polyvinyl chloride, probably owing to the content of plasticizer, which may amount to as much as 35 to 50 parts per 100 parts by weight of polyvinyl chloride. Some adhesives have been formulated which will give a satisfactory bond to plasticized polyvinyl chloride but these are generally unsatisfactory because they incorporate a solvent or a toxic adhesion promoter whose release into the atmosphere of the workshop is difficult to avoid. Where the solvent is cyclohexanone this has a lingering smell and is dangerously flammable. Other solvents such as dimethylformamide, tetrahydrofuran and chlorinated solvents are often flammable or toxic. Adhesion promoters such as isocyanates are highly toxic.

PREPARATION OF PADDED ARTICLES

This application is a continuation-in-part of my application Ser. No. 846,229 filed Oct. 27, 1977, now abandoned which is in turn a continuation-in-part of my application Ser. No. 687,779 filed May 19, 1976 now abandoned.

The invention relates to the preparation of cushions or like padded articles comprising a shaped cover of a vinyl chloride polymer sheet filled with a foam and in particular to improving the adhesion between said cover and foam.

BACKGROUND TO THE INVENTION

It is difficult to adhere materials such as foams to plasticized polyvinyl chloride, probably owing to the content of plasticizer, which may amount to as much as 35 to 50 parts per 100 parts by weight of polyvinyl chloride. Some adhesives have been formulated which will give a satisfactory bond to plasticized polyvinyl chloride but these are generally unsatisfactory because they incorporate a solvent or a toxic adhesion promoter whose release into the atmosphere of the workshop is difficult to avoid. Where the solvent is cyclohexanone this has a lingering smell and is dangerously flammable. Other solvents such as dimethylformamide, tetrahydrofuran and chlorinated solvents are often flammable or toxic. Adhesion promoters such as isocyanates are highly toxic.

Water dispersions or latices of certain synthetic rubbers and acrylic resins are not toxic, do not have an undesirable smell and have been found to give a bond, but not a particularly satisfactory bond, to plasticized polyvinyl chloride.

It is known to obtain a bond between polyvinyl chloride sheeting and a foam by preparing the foam in situ in contact with said sheeting. However the degree of adhesion between the sheeting and foam has left much to be desired and has not been significantly improved using known adhesives and/or barrier layers.

It is therefore an object of the invention to prepare cushions or other resilient padded articles comprising vinyl chloride polymer sheeting and foam in a manner to provide good adhesion between the sheeting and foam.

BRIEF SUMMARY OF THE INVENTION

According to the invention there is provided a method of preparing a padded article comprising the steps of (a) shaping a sheet of plasticized vinyl chloride polymer by vacuum forming to provide a shaped cover, (b) holding said cover in a female mould, (c) placing within said cover the precursors of a polyurethane foam, (d) allowing said precursors to foam and fill said cover to provide a resilient foam filling, said foam being bonded to said cover and retaining said cover in the required shape, wherein the surface of said sheet which is to be in contact with said foam is treated at any time before step (c) and substantially in the absence of organic solvent with an aqueous primer comprising (A) a latex of butadiene-acrylonitrile copolymer containing a hydroxyl or carboxyl group; and;

(B) a latex chosen from the group consisting of natural rubber, styrene-butadiene latex and mixtures thereof in an amount sufficient to promote bonding and wherein the weight ratio of (A) and (B) is from 4:1 to 1:4, and the treated surface is dried.

Surprisingly we have found that the addition of the latex mixture prior to foaming in situ gives a greatly improved bond even though these materials have themselves practically no adhesion at all to vinyl chloride polymers. For example we have found that such latex mixtures can provide a 10-fold increase in adhesion between the sheeting and foam.

The various latices which are used are not highly toxic and the water used in the aqueous dispersion gives no odour and has no inflammability problem.

The precursors of the polyurethane foam are placed within the shaped cover of vinyl chloride polymer, and there is accordingly substantially no release of toxic isocyanate component or of flammable solvent into the surroundings.

The invention is not only applicable to vinyl chloride homopolymers but also extends to the bonding to vinyl chloride copolymers such as copolymers of vinyl chloride and vinyl acetate, vinylidene chloride, a vinyl ether, an acrylate or a methacrylate. Therefore as used herein the term "vinyl chloride polymer" is to be construed as including references to co-polymers.

Suitable apparatus of a conventional kind for carrying out the method of the invention is shown in the drawings, in which.

Figure 1:
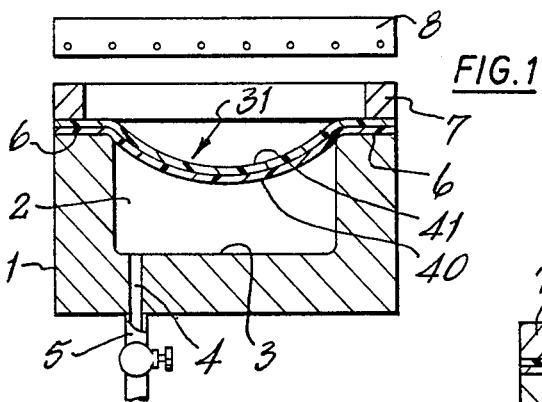
FIG. 1 is a schematic representation of a female mold section of an apparatus in which a resilient padded article can be prepared from a sheet of plasticized vinyl chloride polymer which has been coated with an aqueous primer composition comprising the ingredients (A) and (B) referred to above.

FIG. 1 shows a female mold section 1 having a mold cavity 2 with a molding surface 3 corresponding to the contour of the desired resilient padded article 30 (FIG. 4), such as a seat cushion. The padded article comprises a cover portion 31 and a filling of polyurethane foam 32 which is firmly bonded thereto.

The female mold section 1 (FIG. 1) has a passageway 4 connected to a conduit 5 which in turn is connected to a vacuum pump (not shown). The mold section also has shoulders 6 in cooperation with which a clamping frame 7 can hold in position the periphery of sheet 31 comprising plasticized vinyl chloride polymer which is to be formed into the desired shaped cover. Immediately above the clamping frame there is an overhead heater 8.

Figure 3:
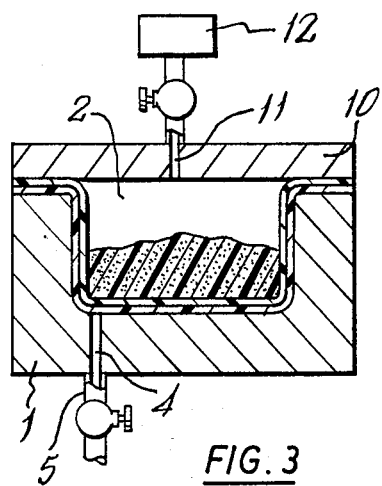
FIG. 3 is a schematic representation similar to FIG. 1 showing the foaming of polyurethane precursors within the shaped cover in the closed mold.
Figure 4:
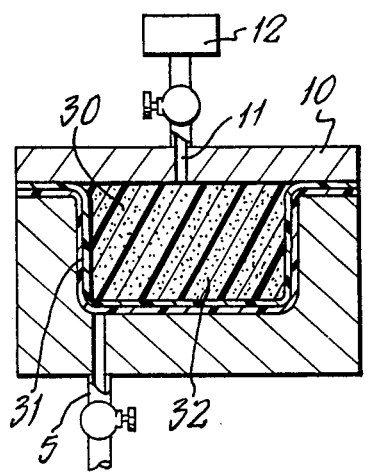
FIG. 4 is a schematic representation similar to FIG. 3 showing the resilient padded article which has been formed through filling of the shaped cover with polyurethane foam and bonding of the latter to said cover.

FIGS. 3 and 4 show the female mold section closed by a lid 10 through which there is a passageway 11 communicating with a tank 12 for the supply of polyurethane precursors to the mold cavity 2.

Figure 2:
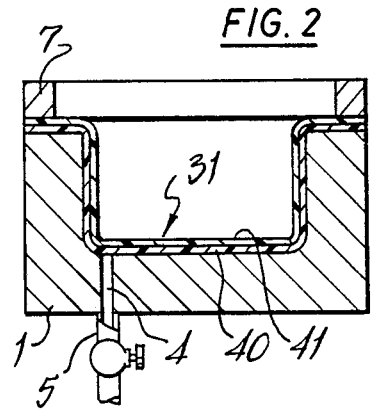
FIG. 2 is a schematic representation similar to FIG. 1 showing the sheet formed into a shaped cover in the mold.

In operation (see FIG. 1) the sheet 31, whose lower portion 40 is of plasticized vinyl chloride polymer and whose upper portion 41 is a coating formed by treatment, as described more fully later herein, with the aqueous primer composition comprising the ingredients (A) and (B) defined earlier herein, is clamped in place by frame 7 over the cavity 2 of female mold section 1. The sheet is then heated by heater 8 until soft, and air is then exhausted from the mold cavity 2 via passageway 4, so that the sheet 31 is drawn down into the cavity and thus made to assume the desired shape of cover (FIG. 2). Clamping frame 7 is then removed, and passageway 4 may if desired be reconnected to atmosphere.

The female mold section is then closed by lid 10 as shown in FIG. 3, and an appropriate amount of mixed polyurethane precursors is delivered from supply tank 12 into the shaped cover 31 via passageway 11 in lid 10. The generated polyurethane fills the mold cavity and becomes firmly bonded to the cover of plasticized vinyl chloride polymer through its strong adhesion to the coating 41 on said polymer. The lid 10 is then removed, and the resilient padded article comprising foamed interior 32 within cover 31 is then removed from the mold.

For the preparation of the aqueous primer composition, suitable butadiene-styrene copolymer latices are available commercially with a wide range of ratios of butadiene to styrene. All seem to promote excellent bonding when used according to the invention to give adhesives with differing degrees of flexibility and surface tack. Styrene homopolymer latex tends to give very brittle adhesive films, and because the adhesive should be relatively flexible a proportion of butadiene is required. Natural rubber latex may be used in place of or in combination with the butadiene-styrene latex.

The other component of the aqueous primer composition, which greatly assists the formation of a good bond to the polyurethane foam, is an acrylonitrile-butadiene copolymer containing an —OH or a —COOH group.

The relative ratio of the components A and B of the primer composition can vary over a wide range from 4:1 to 1:4. Excellent results are given in the weight ratio of 1:1.

The primer composition may be applied to the vinyl chloride polymer sheeting before or after shaping prior to the foaming step, and by any suitable coating method e.g. brushing or spraying. Application is suitably in an amount to give a dry coating of weight in the range 2-50 grams per square meter of sheeting. The vacuum forming of the sheet material is accomplished in a known manner by heating the sheet to soften it, e.g. to a temperature of 150° C. to 180° C., and then drawing it down into a female mould or over a male mould designed for vacuum forming. Such moulds allow a pressure differential to be established across the moulding surface whereby the sheet material is forced against the moulding surface.

After shaping the sheet to form a cover the cover is held within a female mould for the foaming operation. In the case of shaping in a female mould the cover may be held in the same mould or a different mould.

The precursors of the foam are injected into the cover and allowed to foam. Preferably the mould within which the cover is held is provided with a lid to ensure even compact foaming throughout the article.

An example of a particularly preferred primer composition for use in the invention is as follows (all parts being by weight):

| | |
|---|---|
| Manoxol OT (Wetting Agent) | 10 |
| Calasec MAH (Thickener/Stabiliser) | 20 |
| Water | 100 |
| Litex 35 (Styrene-butadiene latex) | 100 |
| Hycar 1571 (Carboxylic modified butadiene high acrylonitrile latex) | 50 |
| Hycar 1577 (Carboxylic modified butadiene medium acrylonitrile latex) | 50 |

The adhesive was prepared by mixing the various components together in the order shown.

The resulting latex mixture was found to give an excellent bond between plasticized vinyl chloride polymer sheeting and polyurethane foam.

In a typical procedure, the latex mixture was applied at a weight of 8 grams (dry coating weight) per square meter to a plasticized polyvinyl chloride sheet of weight 1000 grams per square meter bonded to a knitted fabric of weight 200 grams per square meter. After vacuum forming the coated laminate to form a cover with the latex-coated polyvinylchloride forming the inside surface of the cover, the cover was held within a lidded female mould, and polyurethane foam precursors (i.e. reactants whose admixture results in the formation of polyurethane foam) which had immediately beforehand been mixed in a conventional high speed mixer (Baxenden Isofoam machine) were injected into it in an amount sufficient to form a layer about 10 cm. thick of resilient foamed polyurethane. The precursors employed were a fully blended polyether polyol composition (ICI Polyol DPC 982, containing: a polyol of hydroxyl number 36; a silicone to control cell size in the foam produced; catalyst; and water) and polyisocyanate component (ICI Suprasec MT8, containing: toluene 2,4- and 2,6-diisocyanates, and 4,4'-diisocyanato-diphenylmethane).

After the foam had cured and matured, the lid was taken off the mould and the moulded article was removed.

I claim:

1. A method of preparing a resilient padded article comprising the steps of
    (a) shaping a sheet of plasticized vinyl chloride polymer by vacuum forming to provide a shaped cover,
    (b) holding said cover in a female mould,
    (c) placing within said cover the precursors of a polyurethane foam,
    (d) allowing said precursors to foam and fill said cover to provide a resilient foam filling, said foam being bonded to said cover and retaining said cover in the required shape, wherein the surface of said sheet which is to be in contact with said foam is treated at any time before step (c) and substantially in the absence of organic solvent with an aqueous primer composition comprising:
        (A) a latex of butadiene-acrylonitrile copolymer containing a carboxyl group; and
        (B) a latex chosen from the group consisting of natural rubber, styrene-butadiene latex and mixtures thereof in an amount sufficient to promote bonding and wherein the weight ratio of (A) and (B) is from 4:1 to 1:4, and the treated surface is dried.

2. The method of claim 1 wherein in said priming composition the weight ratio of (A) to (B) is about 1:1.

3. The method of claim 1 wherein said aqueous priming composition comprises in relative parts by weight 10 parts wetting agent, 20 parts thickener/stabilizer, 100 parts water, 100 parts styrene-butadiene latex, 50 parts carboxylic modified butadiene high acrylonitrile latex and 50 parts carboxylic modified butadiene medium acrylonitrile latex.

4. The method of claim 1 wherein said aqueous priming composition is applied to said sheet of vinyl chloride polymer prior to shaping said sheet.

* * * * *